United States Patent
Pak et al.

(10) Patent No.: US 9,280,663 B2
(45) Date of Patent: Mar. 8, 2016

(54) APPARATUS AND METHOD FOR ANALYZING MALWARE IN DATA ANALYSIS SYSTEM

(71) Applicant: Samsung Electronics Co. Ltd., Suwon-si, Gyeonggi-do (KR)

(72) Inventors: Michael Pak, Hwaseong-si (KR); Kyung-Hee Lee, Yongin-si (KR); Na-Hea-Sal Kim, Suwon-si (KR); Jae-Hoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 517 days.

(21) Appl. No.: 13/713,381

(22) Filed: Dec. 13, 2012

(65) Prior Publication Data

US 2013/0152202 A1   Jun. 13, 2013

(30) Foreign Application Priority Data

Dec. 13, 2011   (KR) ........................ 10-2011-0133660

(51) Int. Cl.
*G06F 21/56*   (2013.01)
*H04W 12/12*   (2009.01)
*H04L 29/06*   (2006.01)

(52) U.S. Cl.
CPC .............. *G06F 21/56* (2013.01); *G06F 21/562* (2013.01); *G06F 21/567* (2013.01); *H04W 12/12* (2013.01); *H04L 63/145* (2013.01)

(58) Field of Classification Search
CPC ......... G06F 21/00; G06F 21/50; G06F 21/55; G06F 21/56–21/564; G06F 21/566; G06F 21/568; H04L 63/14–63/1416; H04L 63/1441; H04L 63/145; H04W 12/08
See application file for complete search history.

(56) References Cited

U.S. PATENT DOCUMENTS

| 6,016,546 A | * | 1/2000 | Kephart | ................ | G06F 21/564 726/24 |
| 7,865,965 B2 | * | 1/2011 | Kramer | ................ | H04L 63/145 726/30 |

(Continued)

FOREIGN PATENT DOCUMENTS

| CN | 101039177 A | 9/2007 |
| CN | 101098226 A | 1/2008 |

(Continued)

OTHER PUBLICATIONS

Sang Kil Cha et al, Splitscreen: Enabling Efficient, Distributed Malware Detection, Journal of Communications and Networks, Apr. 1, 2011, pp. 187-200, vol. 13, No. 2, Korean Institute of Communication Sciences, Seoul, KR.

(Continued)

*Primary Examiner* — Eric W Shepperd
(74) *Attorney, Agent, or Firm* — Jefferson IP Law, LLP (57) ABSTRACT

An apparatus and method for analyzing malware in a data analysis system are provided. The apparatus includes a data analysis unit and a controller. The data analysis unit sorts data into primary harmful data and primary harmless data using screening data information of malicious code information and virus information. The controller screens or deletes the primary harmful data, and sends a request for precision analysis of the primary harmless data to a server. The data analysis unit sorts secondary harmful data from the primary harmless data using the precision analysis result received from the server.

20 Claims, 7 Drawing Sheets

(56) References Cited

U.S. PATENT DOCUMENTS

| | | | |
|---|---|---|---|
| 8,296,759 B1* | 10/2012 | Hutchins et al. .................. 718/1 |
| 8,756,683 B2* | 6/2014 | Manion .................. G06F 21/56 726/22 |
| 2003/0191957 A1* | 10/2003 | Hypponen ............ H04L 63/145 726/24 |
| 2006/0095705 A1* | 5/2006 | Wichelman ........... G06F 3/0605 711/171 |
| 2008/0155264 A1* | 6/2008 | Brown .................. H04L 63/145 713/177 |
| 2008/0256636 A1* | 10/2008 | Gassoway ....................... 726/24 |
| 2008/0320548 A1* | 12/2008 | Tripathi et al. ................... 726/1 |
| 2009/0222923 A1* | 9/2009 | Dixon .................. G06F 21/563 726/24 |
| 2011/0107425 A1* | 5/2011 | Lee ....................... G06F 21/566 726/24 |
| 2011/0119764 A1* | 5/2011 | Wade .................... G06F 21/566 726/24 |
| 2011/0154495 A1* | 6/2011 | Stranne .......................... 726/24 |
| 2011/0197279 A1* | 8/2011 | Ueoka ..................... G06F 21/56 726/24 |
| 2011/0239300 A1* | 9/2011 | Klein et al. ...................... 726/23 |
| 2012/0017277 A1* | 1/2012 | Fang .................. H04L 63/0227 726/24 |
| 2012/0124007 A1* | 5/2012 | Sten .................... G06F 11/1448 707/685 |
| 2012/0131675 A1* | 5/2012 | Dai et al. ........................ 726/24 |
| 2012/0192273 A1* | 7/2012 | Turbin et al. .................... 726/23 |
| 2013/0019306 A1* | 1/2013 | Lagar-Cavilla et al. ........ 726/22 |
| 2013/0111591 A1* | 5/2013 | Topan et al. .................... 726/24 |

FOREIGN PATENT DOCUMENTS

| | | |
|---|---|---|
| CN | 102081714 A | 6/2011 |
| CN | 102164148 A | 8/2011 |
| EP | 2 388 727 A1 | 11/2010 |
| KR | 10-2011-0008854 A | 1/2011 |
| KR | 10-2011-0045842 A | 5/2011 |
| KR | 10-2011-0055808 A | 5/2011 |
| KR | 10-2011-0055809 A | 5/2011 |
| WO | 2006/060581 A2 | 6/2006 |
| WO | 2011/096987 A1 | 8/2011 |

OTHER PUBLICATIONS

Rozenburg et al., A Distributed Framework for the Detections of New Worm-Related Malware, Intelligence and Security Informatics, Dec. 3, 2008, pp. 179-190, Springer Berlin Heidelberg, Heidelberg, Berlin.

Kim et al. MODELZ: Monitoring, Detection. and Analysis of Energy-Greedy Anomalies in Mobile Handsets, IEEE Transactions on Mobie Computing, Jul. 1, 2011, pp. 968-981, vol. 10, No. 7, IEEE Service Center, Los Alamitos, CA, US.

* cited by examiner

APPARATUS AND METHOD FOR ANALYZING MALWARE IN DATA ANALYSIS SYSTEM

PRIORITY

This application claims the benefit under 35 U.S.C. §119(a) to a Korean patent application filed in the Korean Intellectual Property Office on Dec. 13, 2011 and assigned Serial No. 10-2011-0133660, the entire disclosure of which is hereby incorporated by reference.

BACKGROUND OF THE INVENTION

1. Field of the Invention

The present invention relates to an apparatus and method for analyzing malware such as data infected with viruses, malicious codes and the like, in a portable terminal.

2. Description of the Related Art

In recent years, portable terminals have quickly become a necessity to modern people. Service providers and system manufacturers are competitively developing various products and services to serve this rapidly developing market. For example, portable terminals are evolving into multimedia equipment for phone books, games, short messages, electronic mail (e-mail) messages, morning wakeup calls, MPEG-1 Audio Layer 3 (MP3) players, schedule management functions, digital cameras, multimedia messages, wireless Internet services, and a variety of other products and services.

In recent years, smart phones are beginning to replace existing computer as smartphone hardware performance is improved and application programs are introduced. Unfortunately, as a result of this evolution, mobile malware attacking portable terminals are beginning to emerge. This malware is causing serious damage, such as inducing an erroneous operation of a portable terminal, deleting data, or leaking user personal information irrespective of user's intention.

To address these issues, a security enterprise supplies anti-virus software adapted to the mobile environment. This software is able to detect and delete malware. Typically, a malware detection scheme lists and stores information about malware, and determines whether data is malware according to a list. The list of malware is provided by the security enterprise. However, a portable terminal may fail to detect malware detection because the database may not be fully updated.

Although new malware not included in the list transmitted to the portable terminal from the security enterprise is discovered, the portable terminal may fail to detect this malware because information about the new malware has not yet been updated. Accordingly, to address this issue, there is a need for an apparatus and method for detecting malware in real-time in a data analysis system.

Therefore, a need exists for a system and method for performing a self diagnosis of a device without the inconvenience caused when manually selecting a self diagnosis item from a computer or a user interface.

SUMMARY OF THE INVENTION

Aspects of the present invention are to address at least the above-mentioned problems and/or disadvantages and to provide at least the advantages below. Accordingly, an aspect of the present invention is to provide an apparatus and method for improving a malware analysis capability in a data analysis system.

Another aspect of the present invention is to provide an apparatus and method for processing to analyze, through a server, data not determined to be malware in a portable terminal.

Another aspect of the present invention is to provide an apparatus and method for confirming a holding data list of a portable terminal and analyzing malware in a server.

Another aspect of the present invention is to provide an apparatus and method for updating a harmful data list or a non-harmful data list according to the malware analysis result in a server.

The above aspects may be achieved by providing an apparatus and method for analyzing malware in a data analysis system.

In accordance with an aspect of the present invention, an apparatus for analyzing malware in a portable terminal is provided. The apparatus includes a data analysis unit and a controller. The data analysis unit sorts data into primary harmful data and primary harmless data based on screening data information of malicious code information and virus information. The controller screens or deletes the primary harmful data, and sends a request for analysis of the primary harmless data to a server. The data analysis unit sorts secondary harmful data from the primary harmless data based on the analysis result received from the server.

In accordance with another aspect of the present invention, an apparatus for analyzing malware in a server is provided. The apparatus includes a data analysis unit, a search engine, and a server controller. When receiving an analysis request from a portable terminal, the data analysis unit compares data corresponding to the request with harmless data information and harmful data information. When the data corresponding to the request is not included in the harmless data information and the harmful data information, the search engine analyzes the data corresponding to the request. The server controller provides the analysis result to the portable terminal, and updates the harmless data information and the harmful data information based on the analysis result.

In accordance with another aspect of the present invention, a method for analyzing malware in a portable terminal is provided. The method includes sorting data into primary harmful data and primary harmless data based on screening data information of malicious code information and virus information, screening or deleting the primary harmful data, sending a request for analysis of the primary harmless data to a server, and sorting secondary harmful data from the primary harmless data based on the analysis result received from the server.

In accordance with another aspect of the present invention, a method for analyzing malware in a server is provided. The method includes, when receiving an analysis request from a portable terminal, comparing data corresponding to the request with harmless data information and harmful data information and providing the comparison result to the portable terminal and, when the data corresponding to the request is not included in the harmless data information and the harmful data information, analyzing the data corresponding to the request through a search engine, providing the analysis result to the portable terminal, and updating the harmless data information and the harmful data information based on the analysis result.

In accordance with another aspect of the present invention, an electronic device is provided. The electronic device includes one or more processors for executing computer programs, a memory for storing data and instructions, and one or more modules stored in the memory and constructed to be executed by the one or more processors. The one or more modules sort data into primary harmful data and primary harmless data based on screening data information of malicious code information and virus information, screen or delete the primary harmful data, send a request for analysis of the primary harmless data to a server, and sort secondary harmful data from the primary harmless data based on the precision analysis result received from the server.

In accordance with another aspect of the present invention, a server is provided. The server includes one or more processors for executing computer programs, a memory for storing data and instructions, and one or more modules stored in the memory and constructed to be executed by the one or more processors. When receiving an analysis request from a portable terminal, the one or more modules compare data corresponding to the request with harmless data information and harmful data information, provide the comparison result to the portable terminal, when the data corresponding to the request is not included in the harmless data information and the harmful data information, analyze the data corresponding to the request through a search engine, provide the analysis result to the portable terminal, and update the harmless data information and the harmful data information based on the analysis result.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention improve a malware analysis capability in a data analysis system. A data analysis system is described below in which a portable terminal sends an analysis request for data not determined by the portable terminal to be malware to a server, and the server provides the analysis result to the portable terminal. The portable terminal may be a mobile phone, a media player, a tablet computer, a handheld computer, or a Personal Digital Assistant (PDA). The portable terminal may be any portable electronic device, including a device having a combination of two or more functions among these devices. Malware as used herein refers to malicious code and may also include a malicious program or application, virus program, program bug information and the like.

Figure 1:
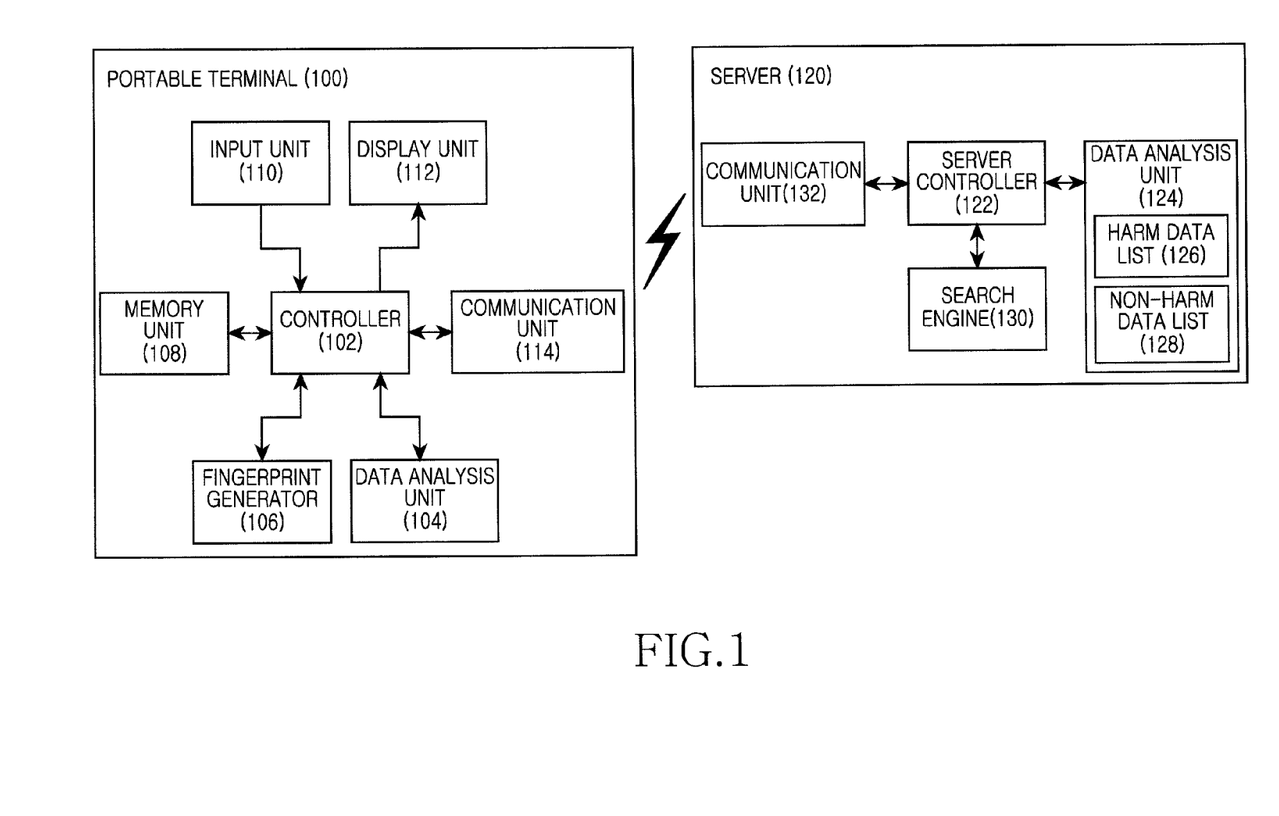
FIG. 1 is a block diagram illustrating a construction of a data analysis system performing a data analysis process according to an exemplary embodiment of the present invention.

FIG. 1 is a block diagram illustrating a construction of a data analysis system performing a data analysis process according to an exemplary embodiment of the present invention.

Referring to FIG. 1, the data analysis system includes a portable terminal 100 and a server 120.

The portable terminal 100 may include a controller 102, a data analysis unit 104, a fingerprint generator 106, a memory unit 108, an input unit 110, a display unit 112, and a communication unit 114.

The controller 102 controls a general operation of the portable terminal 100. For example, the controller 102 performs processing and control for voice call and data communication. In addition to general functions, the controller 102 determines the harmfulness of data. This is to detect the presence of malware (e.g., data exposed to viruses and data capable of maliciously controlling the portable terminal 100). The controller 102 may delete the harmful data from the portable terminal 100.

The controller 102 also requests an analysis of the data by transmitting data determined not to be malware to the server 120, in case the portable terminal 100 has not yet updated information used for malware detection.

The data analysis unit 104 performs a self analysis process of analyzing data of the portable terminal 100 under the control of the controller 102. The data analysis unit 104 performs a data analysis process through a comparison between data stored in the portable terminal 100 and screening data information.

The screening data information refers to a list of data, such as malicious codes, viruses, and the like. The data analysis unit 104 may update the screening data information using information provided from a service provider.

For example, when data included in the screening data information has been stored in the portable terminal 100, the data analysis unit 104 may determine that malware has been stored in the portable terminal 100.

The fingerprint generator 106 generates information about data requiring a precision analysis process under the control of the controller 102. The fingerprint generator 106 may use the data itself requiring the analysis as a fingerprint, and transmit the data to the server 120. The fingerprint generator 106 may also use an IDentifier (ID) of data needed the analysis, a hash function thereof, and the like as the fingerprint, and transmit the ID or the hash function the server 120 in lieu of the data itself.

Operations of the controller 102, the data analysis unit 104, and the fingerprint generator 106 may be executed by a specific software module (i.e., a set of instructions) stored in the memory unit 108. The operations of the controller 102, the data analysis unit 104, and the fingerprint generator 106 may be constructed in software or hardware. The data analysis unit 104 and the fingerprint generator 106 may also be defined as controllers. The controller 102 may a processor, and the data analysis unit 104 and the fingerprint generator 106 may be another (separate) processor.

The memory unit 108 is composed of a Read Only Memory (ROM), a Random Access Memory (RAM), and/or a flash ROM. The ROM stores a microcode of a program for processing and controlling the controller 102, the data analysis unit 104, the fingerprint generator 106, and a variety of reference data.

The RAM is a working memory of the controller 102 and stores temporary data generated during the execution of programs on the portable terminal 100. The flash ROM stores a variety of updateable depository data such as a phone book, an outgoing message, an incoming message, and the like, and stores screening data information including a list of malware, such as malicious codes, viruses, and the like.

The memory unit 108 stores a software module to perform operations of the controller 102, the data analysis unit 104, and the fingerprint generator 106 according to the present invention.

The input unit 110 includes numeral key buttons '0' to '9', a menu button, a cancel button, an OK button, a talk button, an end button, an Internet button, navigation key (or direction key) buttons, and a plurality of function keys such as a character input key. The number and arrangement of the buttons may vary according to the design and function of the portable terminal 100. The input unit 110 provides key input data corresponding to a key pressed by a user, to the controller 102. According to exemplary embodiments of the present invention, the input unit 110 provides user input data for performing a data analysis process to the controller 102.

The display unit 112 displays state information generated during operation of the portable terminal 100, characters, moving pictures, still pictures, and the like. The display unit 112 may be a color Liquid Crystal Display (LCD), an Active-Matrix Organic Light-Emitting Diode (AMOLED) and the like. The display unit 112 may include a touch input device, in which case, the display unit 112 may be used as an input device of the portable terminal in addition to or instead of the input unit 110. The display unit 112 outputs the result of analyzing potential malware.

The communication unit 114 transmits/receives and processes a wireless signal of data input/output through an antenna (not shown). For transmission, the communication unit 114 processes original data through channel coding and spreading, converts the original data into a Radio Frequency (RF) signal, and transmits the RF signal. For reception, the communication unit 114 converts a received RF signal into a baseband signal, processes the baseband signal through de-spreading and channel decoding, and restores the signal to original data. The communication unit 114 communicates with the server 120 (and other devices on the network) and transmits/receives data information needing data analysis and the result thereof.

The roles of the data analysis unit 102 and the fingerprint generator 104 may be implemented by the controller 102 of the portable terminal 100. While these are separately constructed and shown herein as an exemplary construction for convenience of description, this description is not intended to limit the scope and spirit of the present invention. It will be understood by those skilled in the art that various modifications of construction can be made within the scope of the present invention. For example, all of these units may be executed by the controller 102.

The server 120 may include the server controller 122, the data analysis unit 124, the search engine 130, and the communication unit 132. The data analysis unit 124 may include a harmful data list 126 and a non-harmful data list 128.

The server 120 includes the search engine 130 for determining the harmfulness of data. The search engine 130 may include a plurality of search engines using different analysis technologies so as to improve a harmfulness determination rate of data. The server 120 may analyze data with each search engine and determine the harmfulness of the data. For example, the server 120 may include a search engine A, a search engine B, a search engine C, and analyze data using the search engines A, B, and C.

The server controller 122 of the server 120 determines the harmfulness of data and compares data requested by the portable terminal 100 with a harmful data list and determine the harmfulness of the data. When receiving a request for data not included in the harmful data list from the portable terminal 100, the server controller 122 determines the harmfulness of the data through the search engine 130 and notify the portable terminal 100 of the result, and processes to update the harmful data list using the result.

The data analysis unit 124 of the server 120 determines the harmfulness of data requested by the portable terminal 100 under the control of the server controller 122, and updates the harmful data list according to the analysis result of the search engine 130.

When the data requested by the portable terminal 100 is included in the harmful data list 126, the data analysis unit 124 notifies the portable terminal 100 of the harmfulness of the data. Further, when the data requested by the portable terminal 100 is included in the non-harmful data list 128, the data analysis unit 124 notifies the portable terminal 100 of the harmlessness of the data.

The harmful data list 126 is a list including information of data determined to be harmful among data analyzed through the search engine 130, and the non-harmful data list 128 is a list including information of data determined to be harmless among the data analyzed through the search engine 130.

The search engine 130 analyzes data requested by the portable terminal 100 in order to determine the harmfulness of the data, determine if there is an abnormal code or header, provide the analysis result to the data analysis unit 124, and update the harmful data list.

As described above, the search engine 130 may be composed of a plurality of search engines using different analysis technologies and analyzing data using the respective search engines.

The communication unit 132 communicates with the portable terminal 100, receives data information requiring a data analysis process, and transmits the analysis result of data.

Operations of elements constituting the server may be executed by a specific software module (i.e., a set of instructions) stored in the server 120.

Figure 2:
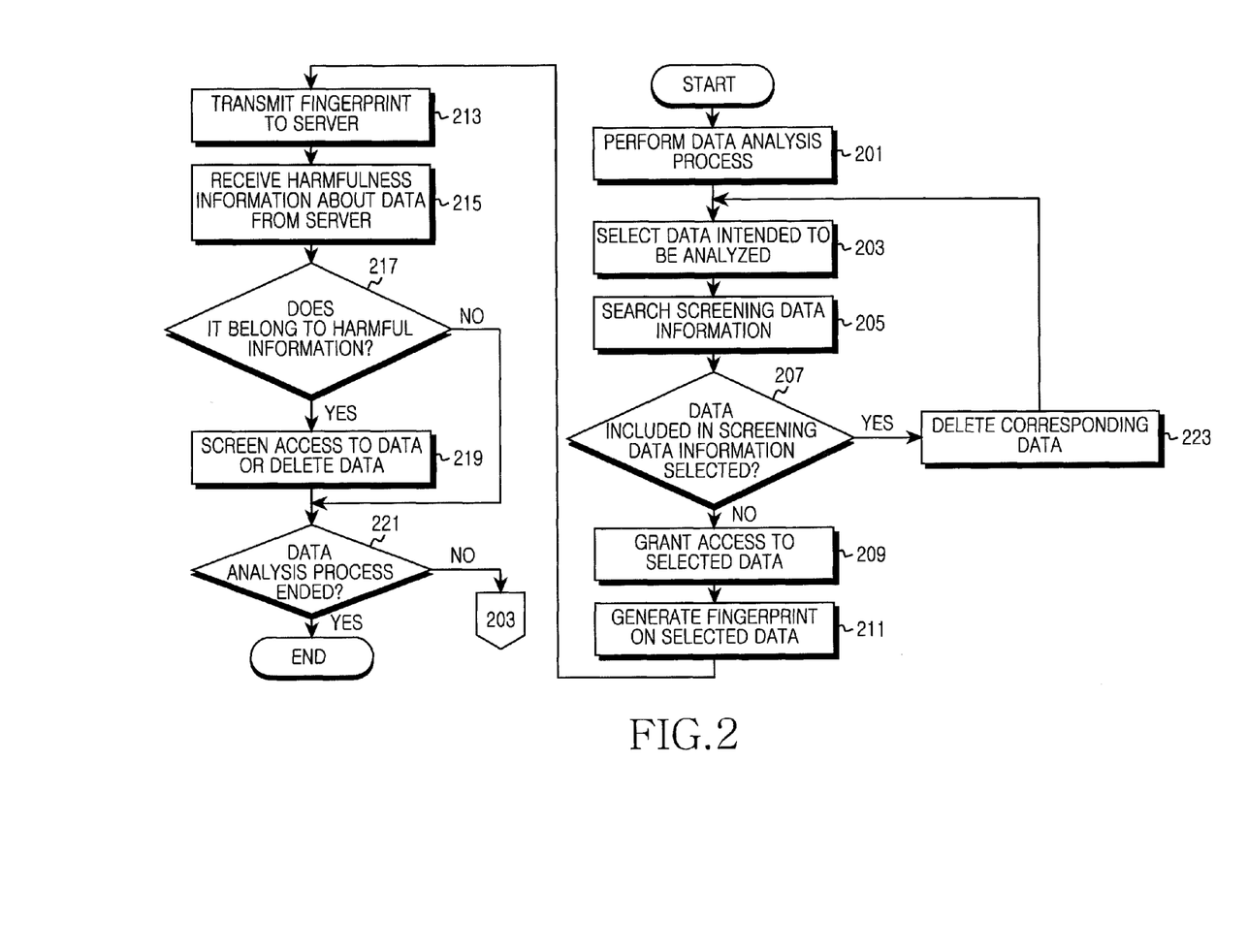
FIG. 2 is a flowchart illustrating a data analysis process of a portable terminal according to an exemplary embodiment of the present invention.

FIG. 2 is a flowchart illustrating a data analysis process of a portable terminal according to a desirable exemplary embodiment of the present invention.

Referring to FIG. 2, the data analysis process may include scanning data stored in the portable terminal and determining whether malware is present in the portable terminal. The data analysis process determines whether a program capable of arbitrarily controlling an operation of the portable terminal (e.g., malware) has been installed.

In step 201, the portable terminal begins the data analysis process. The portable terminal proceeds to step 203 and selects data to be analyzed.

The portable terminal proceeds to step 205 and searches screening data information. The portable terminal proceeds to step 207 and determines whether the data selected in step 203 is data included in the screening data information.

The screening data information refers to a list malware, such as malicious codes, viruses, and the like. The portable terminal may update screening data using information received from a security enterprise.

If it is determined in step 207 that the data included in the screening data information is selected, the portable terminal proceeds to step 223 and processes to delete the data selected in step 203. The portable terminal returns to step 203 and performs a data analysis process for other data not analyzed. When the data is determined in step 203 to be exposed to viruses or damaged the portable terminal may perform a data restoration process (e.g., data care using a vaccine program).

In contrast, if it is determined in step 207 that data not included in the screening data information is selected, the portable terminal proceeds to step 209 and grants an access to the selected data. The portable terminal proceeds to step 211 and generates a fingerprint on the selected data. Although the portable terminal has determined that the selected data is not likely to be malware, the portable terminal generates a fingerprint of the data so as to get a second opinion from a server. The portable terminal may use the data selected in step 203 as the fingerprint, or generate an ID of the data, a hash function thereof, or the like as the fingerprint.

The portable terminal proceeds to step 213 and transmits the generated fingerprint to the server. The portable terminal proceeds to step 215 and receives harmfulness information about data from the server. The server, which is a server for managing malware, analyzes data associated with a fingerprint received from the portable terminal and determines whether the data is malware.

The portable terminal proceeds to step 217 and confirms the harmfulness information received from the server.

If it is determined in step 217 from the server that the data associated with the fingerprint corresponds to harmful information, the portable terminal proceeds to step 219 and processes to deny access to the data and/or delete the data. The portable terminal proceeds to step 221 and determines whether the data analysis process is ended in step 221.

In contrast, if it is determined in step 217 from the server that the data associated with the fingerprint corresponds to harmless information, the portable terminal determines whether the data analysis process is ended in step 221.

If it is determined in step 221 that the data analysis process is not ended, the portable terminal returns to step 203 and performs a data analysis process for other data not analyzed.

In contrast, if it is determined in step 221 that the data analysis process is ended, the portable terminal ends the data analysis process.

Figure 3:
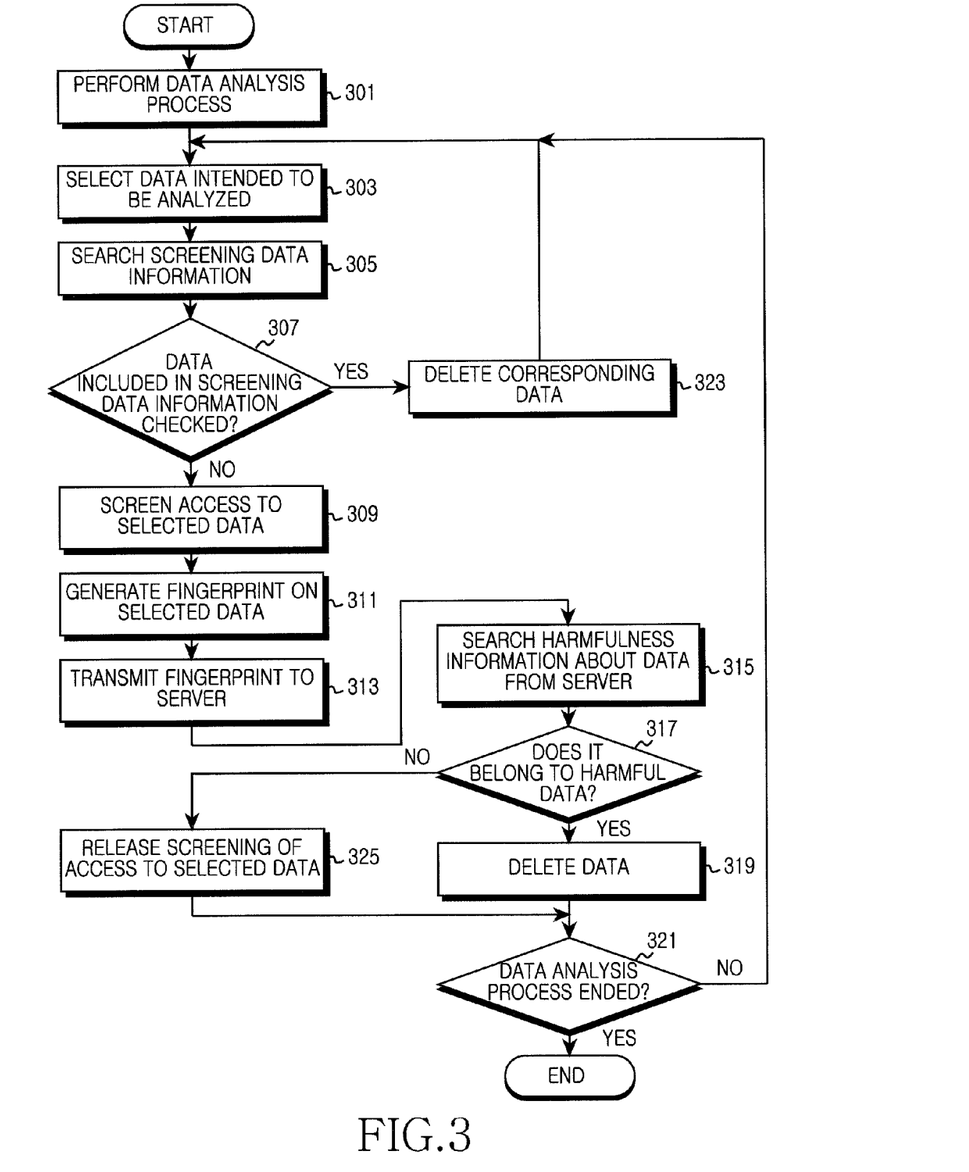
FIG. 3 is a flowchart illustrating a data analysis process of a portable terminal according to another exemplary embodiment of the present invention.

FIG. 3 is a flowchart illustrating a data analysis process of a portable terminal according to another exemplary embodiment of the present invention.

Referring to FIG. 3, in step 301, the portable terminal begins the data analysis process. The portable terminal proceeds to step 303 and selects data intended to be analyzed.

The portable terminal proceeds to step 305 and searches screening data information. The portable terminal proceeds to step 307 and determines whether the data selected in step 303 is data included in the screening data information.

The screening data information refers to a list of malware. The portable terminal may update the screening data using information received from a security enterprise.

If it is determined in step 307 that the data included in the screening data information is selected, the portable terminal proceeds to step 323 and processes to delete the data selected in step 303. The portable terminal returns to step 303 and performs a data analysis process for other data not analyzed.

In contrast, if it is determined in step 307 that data not included in the screening data information is selected, the portable terminal proceeds to step 309 and grants an access to the selected data. The portable terminal proceeds to step 311 and generates a fingerprint on the selected data. This is to consider a situation in which the portable terminal has determined that the selected data is not malware but, owing to a failure of updating of the screening data information and the like, the portable terminal may not detect the malware.

Accordingly, the portable terminal generates a fingerprint of the data so as to get another determination from a server. The portable terminal may use the data itself as the fingerprint, or generate a fingerprint based on an ID of the data, a hash function, thereof and the like.

The portable terminal proceeds to step 313 and transmits the generated fingerprint to the server. The portable terminal proceeds to step 315 and receives harmfulness information about the data from the server. The server, which is a server for managing viruses, malicious codes and the like, analyzes data associated with a fingerprint received from the portable terminal and determines whether the data is malware.

The portable terminal proceeds to step 317 and confirms the harmfulness information received from the server.

If it is determined in step 317 from the server that the data associated with the fingerprint corresponds to harmful information, the portable terminal proceeds to step 319 and processes to deny access to the data and/or delete the data. The portable terminal proceeds to step 321 and determines whether the data analysis process is ended in step 321.

In contrast, if it is determined in step 317 from the server that the data associated with the fingerprint corresponds to harmless information, the portable terminal proceeds to step 325 and releases screening of access to the selected data and proceeds to step 321 and determines whether the data analysis process is completed. The portable terminal screens access to the data determined not to have bad influence until the portable terminal receives the determination that the data is harmless from the server.

If it is determined in step 321 that the data analysis process is not ended, the portable terminal returns to step 303 and performs a data analysis process for other data not analyzed.

In contrast, if it is determined in step 321 that the data analysis process is ended, the portable terminal ends the data analysis process.

Figure 4:
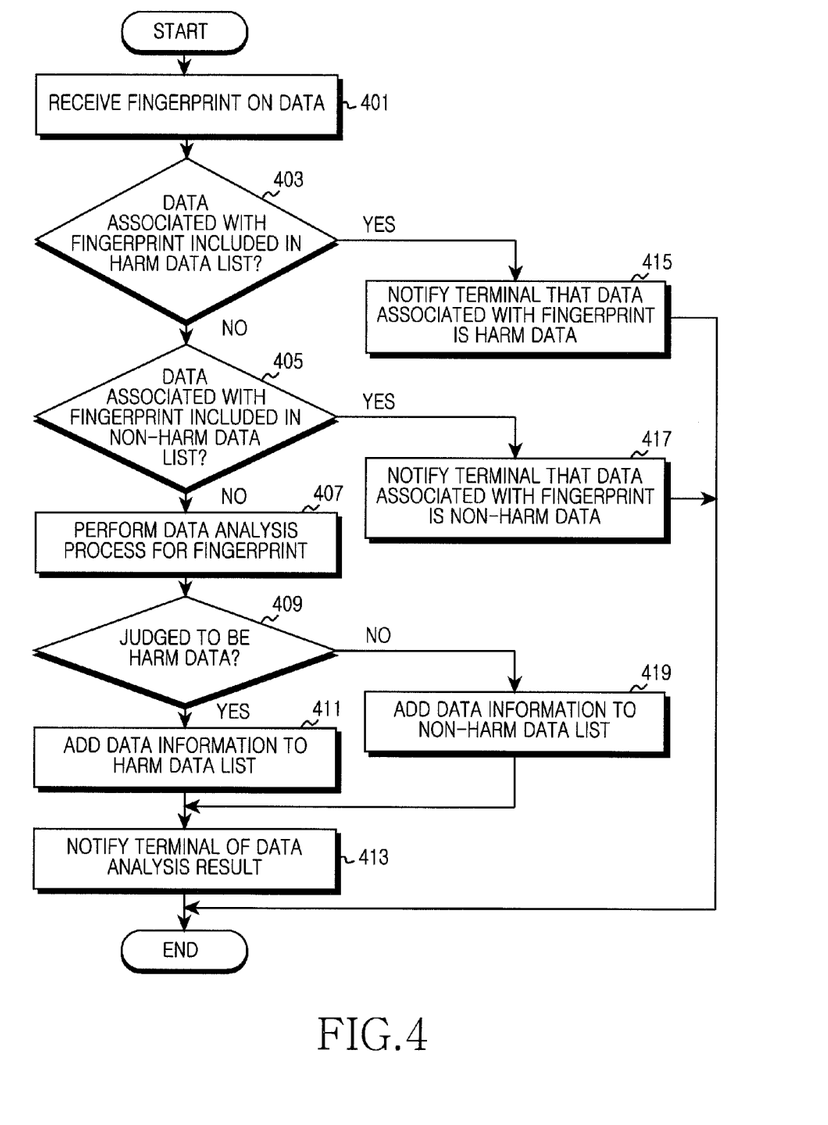
FIG. 4 is a flowchart illustrating a data analysis process of a server according to an exemplary embodiment of the present invention.

FIG. 4 is a flowchart illustrating a data analysis process of a server according to an exemplary embodiment of the present invention.

Referring to FIG. 4, the server, which is a server for managing viruses, malicious codes and the like, analyzes data associated with a fingerprint transmitted by a portable terminal and determines whether the data is malware. The server may include a plurality of search engines and perform a search for the data associated with the fingerprint using one or more of the search engines. The search engine, which is an engine for detecting the harmfulness of data, may be a vaccine engine, a malicious code engine, and the like.

In step 401, the server receives a fingerprint on data from a portable terminal. The fingerprint is information about data that is initially determined not to be malware by the portable terminal. The portable terminal may transmit data, an ID of the data, a hash function thereof, and the like as the fingerprint to the server.

The server proceeds to step 403 and determines whether the data associated with the fingerprint is included in a harmful data list. The harmful data list refers to a list of data that the server determines to be harmful after analyzing the data using a plurality of search engines.

If it is determined in step 403 that the data associated with the fingerprint is data included in the harmful data list, the server proceeds to step 415 and notifies the portable terminal that the data associated with the fingerprint corresponds to harmful data.

In contrast, if it is determined in step 403 that the data associated with the fingerprint is data not included in the harmful data list, the server proceeds to step 405 and determines whether the data associated with the fingerprint is included in a non-harmful data list. The non-harmful data list refers to a list of data that the server determines to be harmless after analyzing using a plurality of search engines.

If it is determined in step 405 that the data associated with the fingerprint is data included in the non-harmful data list, the server proceeds to step 417 and notifies the portable terminal that the data associated with the fingerprint corresponds to non-harmful data.

In contrast, if it is determined in step 405 that the data associated with the fingerprint is data not included in the non-harmful data list, the server proceeds to step 407 and performs a data analysis process for the fingerprint. The server proceeds to step 409 and determines the result of the data analysis process in step 409.

As described above, the server may have a plurality of search engines having different performance and determine the harmfulness of data using the respective search engines.

If it is determined in step 409 that the data associated with the fingerprint is harmful data, the server proceeds to step 411 and processes to add information of the data requested by the portable terminal to the harmful data list.

In contrast, if it is determined in step 409 that the data associated with the fingerprint is non-harmful data, the server proceeds to step 419 and processes to add information of the data requested by the portable terminal to the non-harmful data list.

After updating the data list as above, the server proceeds to step 413 and notifies the portable terminal of the data analysis result and ends the process.

Figure 5:
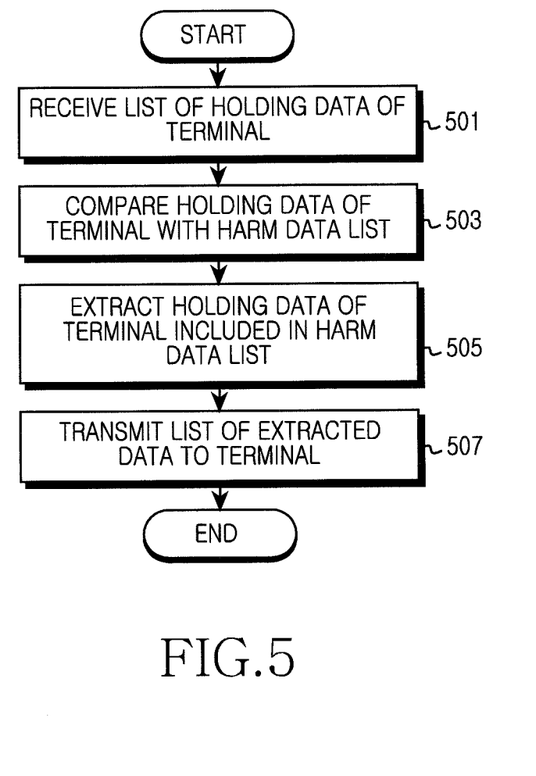
FIG. 5 is a flowchart illustrating a data analysis process of a server according to another desirable exemplary embodiment of the present invention.

FIG. 5 is a flowchart illustrating a data analysis process of a server according to another exemplary embodiment of the present invention.

Referring to FIG. 5, in step 501, the server receives a holding data list from a portable terminal. The holding data list refers to a list of data stored in the portable terminal.

The server proceeds to step 503 and compares the holding data list received from the portable terminal with a harmful data list. The server proceeds to step 505 and extracts holding data of the portable terminal included in the harmful data list.

The server proceeds to step 507 and transmits a list of the extracted data to the portable terminal. Accordingly, the portable terminal may determine that the data included in the list received from the server is harmful data, and restore or delete this data.

Figure 6:
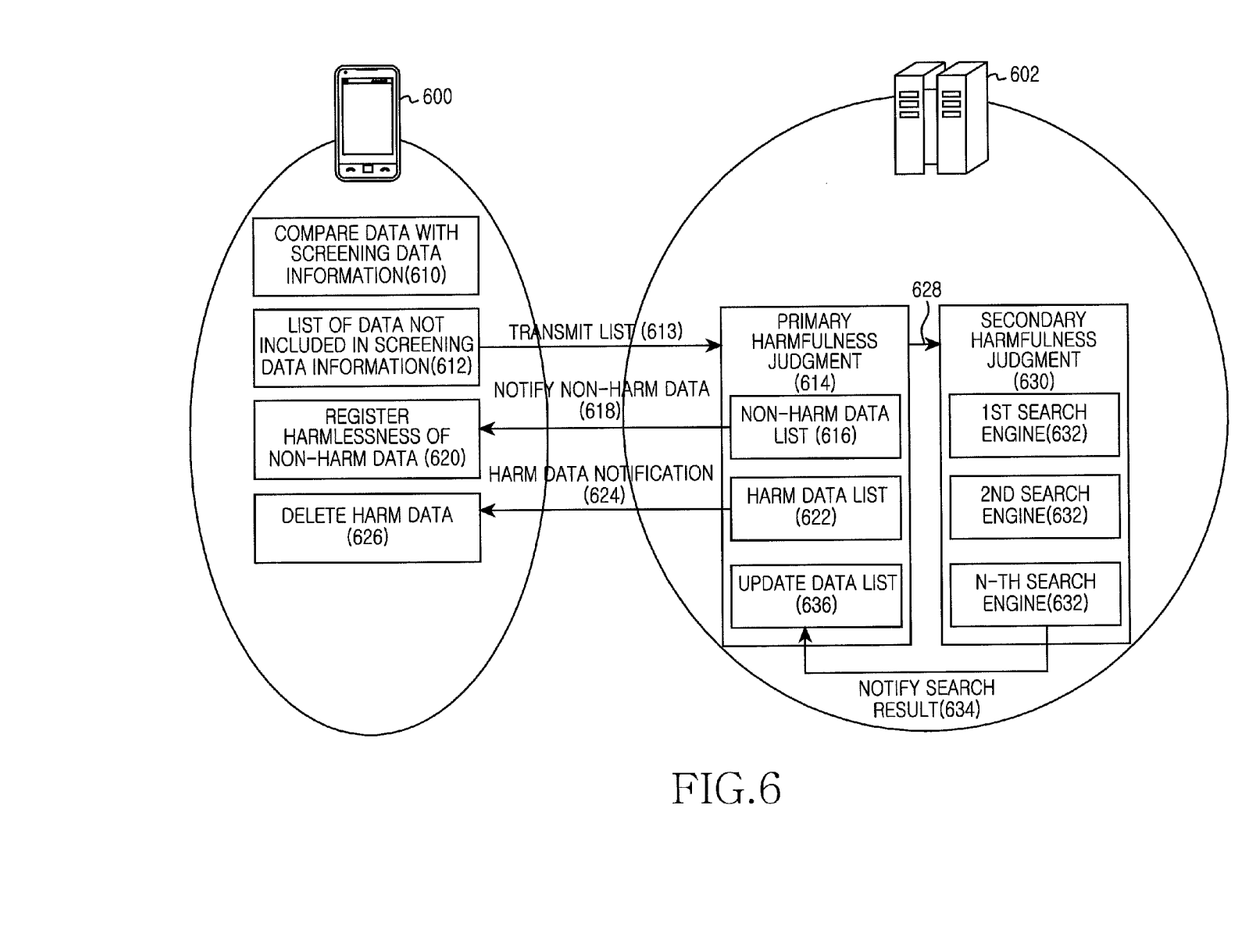
FIG. 6 is a block diagram illustrating a construction of a data analysis system according to an exemplary embodiment of the present invention.

FIG. 6 is a block diagram illustrating a construction of a data analysis system according to a desirable exemplary embodiment of the present invention.

Referring to FIG. 6, the data analysis system may include a portable terminal 600 and a server 602.

The portable terminal 600 determines whether data exposed to viruses is stored in the portable terminal 600 or a program capable of arbitrarily controlling an operation of the portable terminal 600 has been installed, through a data analysis process.

Accordingly, the portable terminal 600 compares in step 610 previously stored data with screening data information. The portable terminal 600 generates in step 612 a list of data not included in the screening data information and sends this list to the server 602 in step 613.

This is because, while the portable terminal 600 may determine that data included in the screening data information is malware but, because there a situation may occur in which the screening data information is not updated, the portable terminal 600 sends the server 602 an analysis request for data not included in the screening data information.

After receiving the list of the data not included in the screening data information, the server 602 first determines in step 614 the harmfulness of the data not included in the screening data information, using a harmful data list.

The server 602 manages the harmful data list including a non-harmful data list 616 and a harmful data list 622, and determines whether data received from the portable terminal 600 is included in the harmful data list 616 or is included in the non-harmful data list 622.

The server 602 notifies the portable terminal 600 in steps 618 and 624 of data included in the non-harmful data list 616 and data included in the harmful data list 622 among the data included in the list received from the portable terminal 600. Accordingly, the portable terminal 600 registers in step 620 the harmlessness of non-harmful data to grant access to the non-harmful data, and deletes harmful data in step 626.

The server 602 provides in step 628 a plurality of search engines 632 with data not included in the harmful data list (i.e., data determined to be neither harmful data nor non-harmful data) among the data included in the list received from the portable terminal 600, and secondarily determines in step 630 the harmfulness of the data not included in the harmful data list. The server 602 performs analysis so as to include information about data that the server 602 has not analyzed, in the harmful data list.

The server 602 detects the harmfulness of data through the plurality of search engines 632, identifies (634) the data that the server 602 has analyzed is harmful or harmless, and updates in step 636 the harmful data list.

The server 602 may transmit the precision analysis result to the portable terminal 600.

Figure 7:
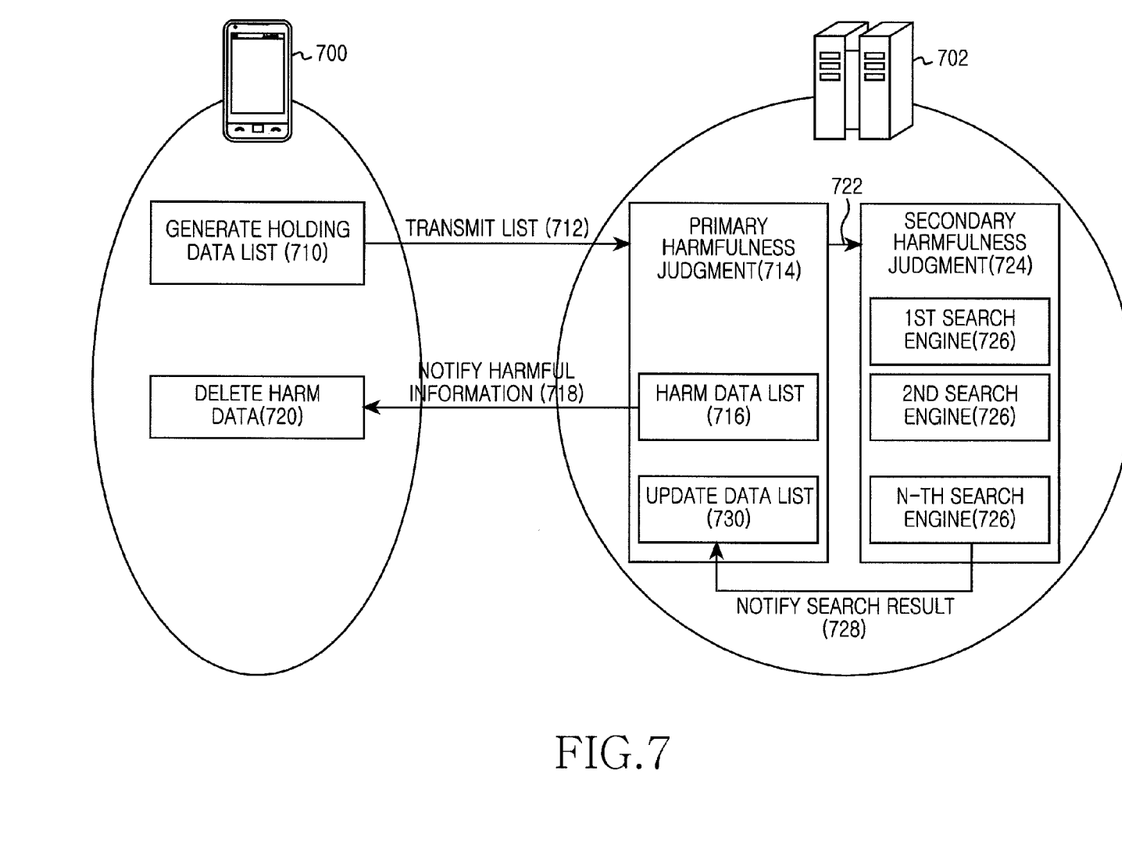
FIG. 7 is a block diagram illustrating a construction of a data analysis system according to another desirable exemplary embodiment of the present invention.

FIG. 7 is a block diagram illustrating a construction of a data analysis system according to another exemplary embodiment of the present invention.

Referring to FIG. 7, the data analysis system includes a portable terminal 700 and a server 702.

The portable terminal 700 determines whether data exposed to viruses exists or a program capable of arbitrarily controlling an operation of the portable terminal has been installed, through a data analysis process.

Accordingly, the portable terminal 700 generates in step 710 a holding data list that is a list of data previously stored in the portable terminal 700, and sends this list to the server 702 in step 712.

Because the portable terminal 700 cannot determine whether the data is malware, the portable terminal 700 provides a list of the stored data to the server 702 and allows the server 702 to determine whether the data includes malware.

The server 702 determines in step 714 the harmfulness of data using a harmful data list managed by the server 702. The server 702 manages the harmful data list and determines whether holding data received from the portable terminal 700 is included in a harmful data list 716.

The server 702 confirms data included in the harmful data list 716 among the data included in the holding data list received from the portable terminal 700 and notifies the portable terminal 700 of this data in step 718. Accordingly, the portable terminal 700 deletes in step 720 the harmful data using information received from the server 702.

The server 702 provides in step 722 a plurality of search engines 726 with data not included in the harmful data list (i.e., data not determined to be harmful data) among the data included in the holding data list received from the portable terminal 700 and determines in step 724 the harmfulness of the data not included in the harmful data list. The server 702 performs an analysis so as to include information about data that the server 702 does not have analyzed, in the harmful data list.

The server 702 detects the harmfulness of data through a plurality of search engines, determines whether the data that the server has analyzed is harmful or harmless, identifies this in step 728, and updates in step 730 the harmful data list.

The server 702 may transmit the analysis result to the portable terminal 700.

Methods according to exemplary embodiments of the present invention may be implemented in hardware, software, or a form of combination thereof.

In case of software implementation, a computer readable storage medium storing one or more programs (i.e., software modules) may be provided. One or more programs stored in the computer readable storage medium are configured to be executable by one or more processors within an electronic device such as a portable terminal. One or more programs include instructions for enabling the electronic device to execute the methods according to the exemplary embodiments disclosed in the claims and/or the specification of the present invention.

These programs (i.e., software modules or software) may be stored in a Random Access Memory (RAM), a nonvolatile memory including a flash memory, a Read Only Memory (ROM), an Electrically Erasable Programmable ROM (EEPROM), a magnetic disk storage device, a compact disk ROM (CD-ROM), a Digital Versatile Disk (DVD) or an optical storage device of other form, and a magnetic cassette. They may also be stored in a memory constructed in a combination of some or all of these components. Similarly, multiple memories may be provided.

The programs may be stored in a storage device attachable to an electronic device and accessible through a communication network, such as the Internet, an intranet, a Local Area Network (LAN), a Wireless LAN (WLAN), or a Storage Area Network (SAN), or a combination thereon. This storage device may access the electronic device through an external port.

Furthermore, a separate storage device on a communication network may access a portable electronic device.

For example, a module of an electronic device, which includes one or more processors, a memory, and one or more modules stored in the memory and configured to be executed by the one or more processors, may include instructions for sorting data into primary harmful data and primary harmless data using screening data information such as malicious code information, virus information and the like, screening or deleting the primary harmful data, sending an analysis request for the primary harmless data to a server, and sorting secondary harmful data from the primary harmless data using the precision analysis result received from the server.

The module may include an instruction for including information about the secondary harmful data in screening data information.

The module may include an instruction for screening access to the sorted secondary harmful data or deleting the secondary harmful data.

The module may include instructions for transmitting holding data information that is information of data stored in a portable terminal, to a server, receiving harmful data information included in the holding data information from the server, and deleting harmful data using the received harmful data information.

According to another exemplary embodiment of the present invention, a module of a server, which includes one or more processors, a memory, and one or more modules stored in the memory and configured to be executed by the one or more processors, may include instructions for, when receiving a precision analysis request from a portable terminal, comparing data corresponding to the request with harmless data information and harmful data information, and providing the comparison result to the portable terminal and, when the data corresponding to the request is not included in the harmless data information and the harmful data information, analyzing data through a search engine, providing the precision analysis result to the portable terminal, and updating the harmless data information and the harmful data information.

The module may include an instruction for analyzing malware using a plurality of search engines using different analysis technologies.

The module may include instructions for, when receiving holding data information from a portable terminal, comparing the holding data information with harmful data information and providing the comparison result to the portable terminal and, when the holding data information is not included in the harmful data information, precisely analyzing data through a search engine, providing the precision analysis result to the portable terminal, and updating the harmful data information according to the present invention.

As described above, exemplary embodiments of the present invention improve a malware analysis capability in a data analysis system. A portable terminal sends a server an analysis request for data not determined by the portable terminal to be malware, and the server provides the analysis result to the portable terminal thereby being capable of improving malware analysis performance.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus configured to analyze malware in a portable terminal, the apparatus comprising:
a data analysis unit configured to sort data into primary harmful data and primary harmless data based on screening data information of malicious code information and virus information; and
a controller configured to:
screen or delete the primary harmful data,
send, in response to the sorting of data into primary harmful data and primary harmless data, a request for analysis of the primary harmless data determined by the portable terminal to a server, and
receive harmfulness information for the primary harmless data from the server,
wherein the data analysis unit sorts data into secondary harmful data and secondary harmless data from the primary harmless data based on the harmfulness information received from the server.

2. The apparatus of claim 1,
wherein the screening data information is provided and updated in a security enterprise, and
wherein the controller comprises information about the secondary harmful data in the screening data information.

3. The apparatus of claim 1, wherein the controller is further configured to screen access to the sorted secondary harmful data or delete the secondary harmful data.

4. The apparatus of claim 1, wherein the controller is further configured to:
transmit holding data information that is information of data stored in the portable terminal, to the server,
receive harmful data information included in the holding data information from the server, and
delete harmful data based on the received harmful data information.

5. An apparatus for analyzing malware in a server, the apparatus comprising:
a data analysis unit configured to compare data corresponding to the request with harmless data information and harmful data information, when receiving an analysis request of previously sorted primary harmless data from a portable terminal, the analysis request being in response to the previously sorted primary harmless data being determined by the portable terminal;
a search engine configured to analyze, when the primary harmless data is not included in the harmless data information and the harmful data information, the primary harmless data corresponding to the request; and
a server controller configured to:
provide an analysis result to the portable terminal, and
update the harmless data information and the harmful data information based on the analysis result.

6. The apparatus of claim 5, wherein the search engine comprises a plurality of search engines that employ different analysis technologies, and is configured to analyze malware using the plurality of search engines,
wherein the plurality of search engines comprises at least a vaccine engine and a malicious code engine.

7. The apparatus of claim 5,
wherein, when receiving holding data information of the primary harmless data from the portable terminal, the data analysis unit is further configured to compare the holding data information with the harmful data information,
wherein, when the holding data information is not included in the harmful data information, the search engine is further configured to analyze the data corresponding to the request, and
wherein the server controller is further configured to:
provide the analysis result to the portable terminal, and
update the harmful data information.

8. A method for analyzing malware in a portable terminal, the method comprising:
sorting data into primary harmful data and primary harmless data based on screening data information of malicious code information and virus information;
screening or deleting the primary harmful data;
sending, in response to the sorting of data into primary harmful data and primary harmless data, a request for analysis of the primary harmless data determined by the portable terminal to a server;
receiving harmfulness information for the primary harmless data from the server; and
sorting data into secondary harmful data and secondary harmless data from the primary harmless data based on the harmfulness information received from the server.

9. The method of claim 8, wherein the screening data information is provided and updated in a security enterprise, and
wherein information about the secondary harmful data is included in the screening data information.

10. The method of claim 8, further comprising screening access to the sorted secondary harmful data or deleting the secondary harmful data.

11. The method of claim 8, further comprising:
transmitting holding data information that is information of data stored in the portable terminal, to the server;
receiving harmful data information included in the holding data information from the server; and
deleting harmful data based on the received harmful data information.

12. A method for analyzing malware in a server, the method comprising:
when receiving a precision analysis request of previously sorted primary harmless data from a portable terminal, the precision analysis request being in response to the previously sorted primary harmless data being determined by the portable terminal, comparing the primary harmless data corresponding to the request with harmless data information and harmful data information, and providing the comparison result to the portable terminal;
when the primary harmless data is not included in the harmless data information or the harmful data information, analyzing the primary harmless data through a search engine;
providing an analysis result to the portable terminal; and
updating the harmless data information and the harmful data information based on the analysis result.

13. The method of claim 12, wherein the analyzing of the data corresponding to the request through the search engine comprises analyzing the data using a plurality of search engines that use different analysis technologies,
wherein the plurality of search engines comprises at least a vaccine engine and a malicious code engine.

14. The method of claim 12, further comprising:
when receiving holding data information of primary harmless data from the portable terminal, comparing the holding data information with the harmful data information, and providing the comparison result to the portable terminal;

when the holding data information is not included in the harmful data information, analyzing the data corresponding to the request through the search engine;
providing the analysis result to the portable terminal; and
updating the harmful data information.

15. An electronic device comprising:
one or more processors for executing computer programs;
a memory for storing data and instructions; and
one or more modules stored in the memory and constructed to be executed by the one or more processors,
wherein the one or more modules are configured to:
  sort data into primary harmful data and primary harmless data based on screening data information of malicious code information and virus information,
  screen or delete the primary harmful data,
  send, in response to the sorting of data into primary harmful data and primary harmless data, a request for precision analysis of the primary harmless data determined by the portable terminal to a server,
  receive harmfulness information for the primary harmless data from the server, and
  sort data into secondary harmful data and secondary harmless data from the primary harmless data based on the harmfulness information received from the server.

16. The electronic device of claim 15, wherein the one or more modules comprise information about the secondary harmful data in the screening data information.

17. The electronic device of claim 15, wherein the one or more modules transmit holding data information that is information of data stored in the portable terminal, to the server, receives harmful data information included in the holding data information from the server, and deletes harmful data based on the received harmful data information.

18. A server comprising:
one or more processors for executing computer programs;
a memory for storing data and instructions; and
one or more modules stored in the memory and constructed to be executed by the one or more processors,
wherein the one or more modules are configured to:
  when receiving an analysis request of previously sorted primary harmless data from a portable terminal, the analysis request being in response to the previously sorted primary harmless data being determined by the portable terminal, compare the primary harmless data corresponding to the request with harmless data information and harmful data information, and
  provide the comparison result to the portable terminal,
  when the primary harmless data is not included in the harmless data information and the harmful data information, analyze the primary harmless data through a search engine,
  provide a precision analysis result to the portable terminal, and
  update the harmless data information and the harmful data information based on the analysis result.

19. The server of claim 18,
wherein the module analyzes malware using a plurality of search engines that use different analysis technologies, and
wherein the plurality of search engines comprises at least a vaccine engine and a malicious code engine.

20. The server of claim 18, wherein,
when receiving holding data information of primary harmless data from the portable terminal, the one or more modules are further configured to:
  compare the holding data information with the harmful data information, and
  provide the comparison result to the portable terminal, and
when the holding data information is not included in the harmful data information, the one or more modules are further configured to:
  analyze the data corresponding to the request through the search engine,
  provide the analysis result to the portable terminal, and
  update the harmful data information.

* * * * *